JOSEPH F. PILARO
INVENTOR.

BY E. J. Berry

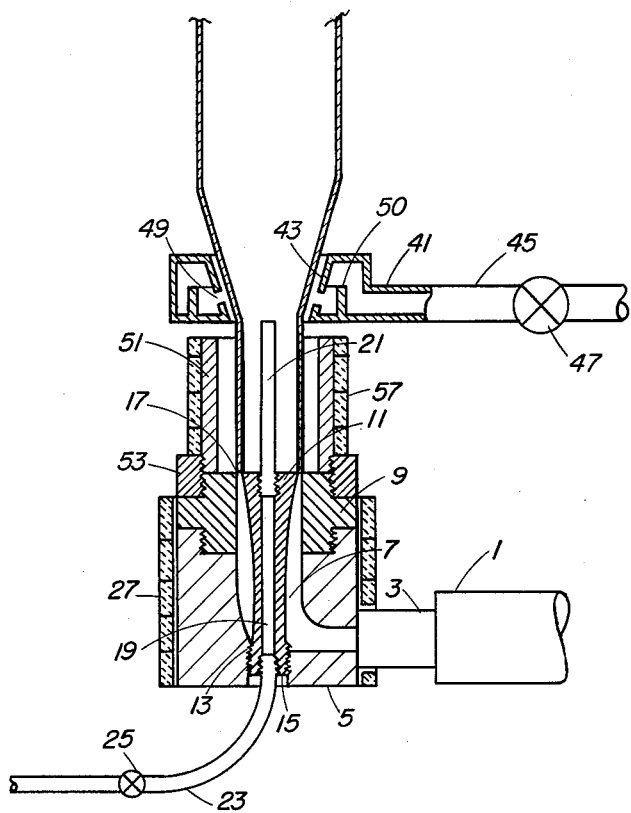
FIG. II
JOSEPH F. PILARO
*INVENTOR.*

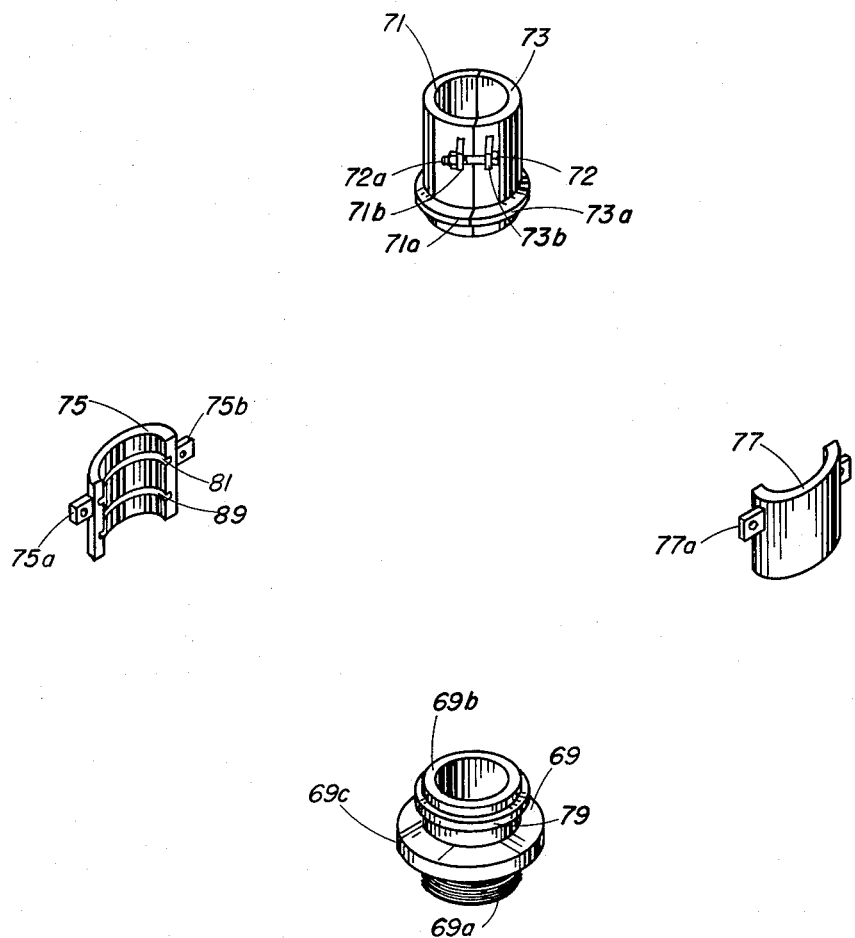
FIG. III
JOSEPH F. PILARO
INVENTOR.
BY E. J. Berry

United States Patent Office 3,243,486
Patented Mar. 29, 1966

3,243,486
METHOD FOR IMPROVING THE OPTICAL PROPERTIES OF THERMOPLASTIC FILMS
Joseph F. Pilaro, Champaign, Ill., assignor to National Distillers and Chemical Corporation, New York, N.Y., a corporation of Virginia
Filed Oct. 6, 1959, Ser. No. 844,747
1 Claim. (Cl. 264—95)

The present invention relates to the art of producing sheeted thermoplastic materials, and more particularly such sheeted material when produced in the form of an expanded or blown tube. The invention relates especially to a method for improving the optical properties of sheeted thermoplastic material, wherein a material such as solid polyethylene powder, chunks and the like is softened under heat and pressure to a substantially uniform, extrudable consistency, and forced through a suitable die structure to form a continuous sheet of the material contemplated. Normally the temperature of the extruded material at the die outlet will be in the range of from about 210° F. to about 400° F. depending upon its composition.

Whether the softened material is extruded as a flat sheet, or as a blown tube, it has been found that certain undesirable optical properties are apt to develop in the finished product. Namely, the finished material may develop an overall or nonuniform lack of clarity, characterized as "haze," or it may exhibit overall or irregularly occurring areas which lack the gloss and smoothness commonly associated with an acceptable finished product.

In the production of sheeted thermoplastic materials by extrusion, it is customary to pass the extruded material through one or more cooling zones immediately following discharge from the forming die. Ordinarily cooling is accomplished by shock chilling in the immediate vicinity of the die, followed by subsequent chilling zones which include an extended zone in which the extruded sheet is exposed to the ambient temperature of the operating environment. Normally the initial cooling or chilling is accomplished by means of air jets, having temperatures in the range of temperatures where substantial conversion of the molecules of the plastic material from an amorphous toward a crystalline state will take place fairly rapidly. Normally, such conversion may be effected at temperatures about 110° F. below the die temperature. For example, with a die temperature of about 320° F., initial conversion will take place at about 210° F. In a second cooling stage, the sheeted material may be further shock chilled, by air jets and then further cooled as by exposure at environmental, ambient temperature.

Under these and comparable operating conditions, the undesirable characteristics of haze and lack of gloss frequently occur. In the past, it has been customary to attempt improvement of the optical properties of such thermoplastic films by increasing the number of so called shock chilling zones, and/or by varying the degree of chilling or cooling between zones. None of these expedients has been wholly or consistently successful.

It is an object of the present invention to provide a method for producing a sheeted thermoplastic material wherein in the desired optical properties such as freedom from haze, surface finish and gloss, and light transmission may be attained consistently to achieve a uniformly acceptable product. To attain the desired result, it is an object of this invention to provide a method and means whereby the sheeted material as extruded from a forming die is subjected to heat soaking or annealing treatment prior to the customary shock chilling and conversion of its molecular structure from an amorphous to a crystalline condition.

Thermoplastic materials contemplated according to the present invention are those synthetic materials which are solid at atmospheric temperatures, and which may be softened under heat and/or pressure to permit casting, extrusion or other processing deformation to produce variously formed shapes as finished products. Typical thermoplastic materials include cellulose acetate, cellulose acetate butyrate, methylmethacrylate, polyethylene, polyvinylidene chloride (plasticized and unplasticized), polyvinyl chloride, vinyl acetate (plasticized and unplasticized), polystyrene, acrylonitrile vinyl, polyisobutylene polyethylene, copolymers of isobutylene and styrene, tetrafluoroethylene, polyamide, blends of rubber, synthetic and natural with vinyl or polyisobutylene-styrene or vinyl, cellulose acetate propionate, polyvinyl alcohol, and ethyl cellulose.

The invention and its objects may be more fully understood from the following description of a typical embodiment when it is read in conjunction with the accompanying drawings representative of an apparatus adapted for the accomplishment of the method contemplated.

In the drawings provided for illustration,

FIG. 2 is a similar view of a portion of the apparatus as shown in FIG. 1, illustrating a modified form of the contemplated apparatus; and FIG. 3 is an exploded view, in perspective, of an alternate construction form adapted to position and retain a two part chimney.

Figure 1:
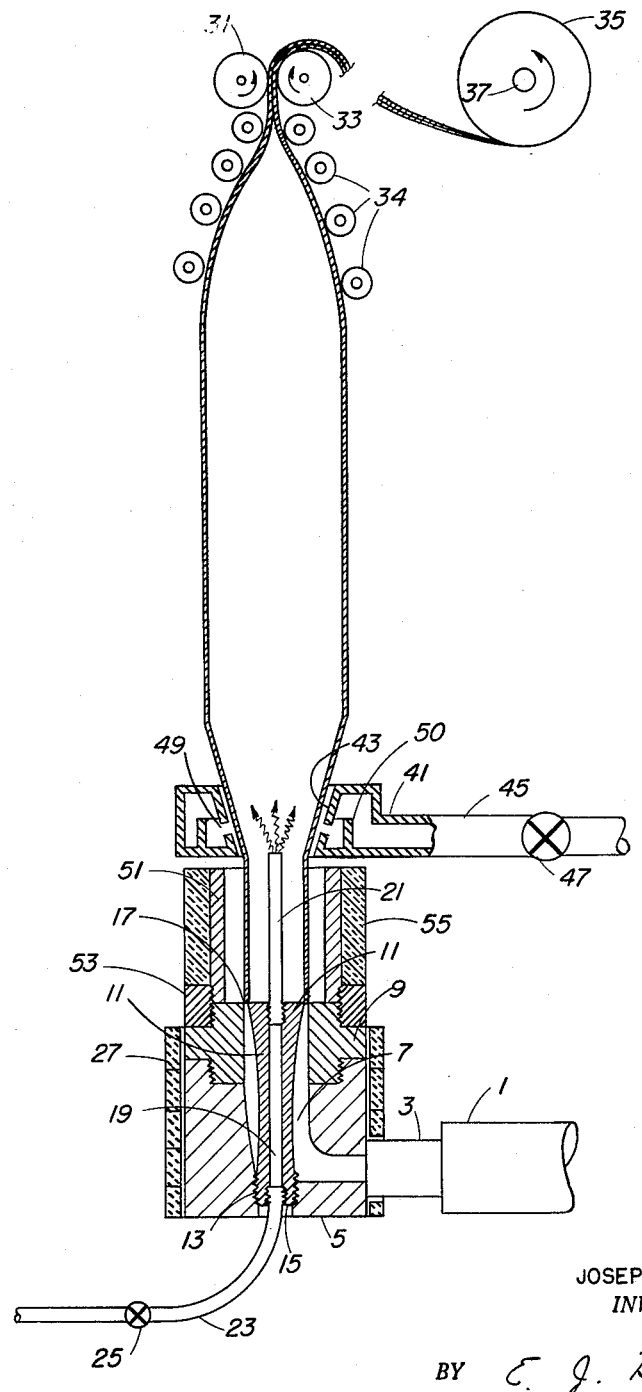
FIG. 1 is a schematic view, partly in vertical section, of a typical apparatus for producing blown tubing from a thermoplastic material such as polyethylene, and including the apparatus features as contemplated according to the present invention.

In the apparatus as shown by FIG. 1, the numeral 1 designates a conventional screw extruded having an outlet 3. A discharge elbow and die body 5 provides an internal passageway 7 which is connected to the extruder outlet at one end, and at the other end is enlarged and threaded to recieve a nipple 9. As shown, the nipple is externally threaded at each end with a flange portion intermediate the threaded ends, and is provided with an internal bore substantially equal in diameter to that of the passageway 7, to form a continuation thereof.

Extending through the nipple bore and passageway 7 is a mandrel member 11. The mandrel is of generally frustoconical conformation, having a cylindrical threaded portion 13 at its apex. The mandrel 11 is disposed in the passageway 7 in an inverted position, with the portion 13 inserted in threaded connection with an internally threaded passageway 15 extended through the wall of elbow 5 in concentric relation to the passageway 7. The mandrel length, from the cylindrical portion 13 to the base thereof, is substantially equal to the length of the passageway 7, whereby to position the base surface in a plane substantially common to one through the outer end of the nipple 9. Also, the diameter of the mandrel base is slightly less than that of the passageway 7 at the outer end of the nipple 9, whereby to define an annular die aperture 17. By empolying mandrels of different base diameters, the width of the aperture may be varied. In addition, the mandrel 11 is provided with a coaxial bore 19 opening therethrough. This bore is internally threaded at each end to receive a pair of conduits 21 and 23, of which the latter is provided with a control valve means 25.

The extruder and die structure described above is adapted for the production of a thin tubing from solid thermoplastic materials which have been softened to an extrudable consistency under heat and pressure in the extruder device 1, and under the pressure thereof forced through the die aperture 17. The temperature of the material within the die structure provided by the elbow 5 may be maintained by suitable heat exchange means such as the electrical resistance heater unit 27 shown in the drawing. The die structure illustrated is of substantially typical design and operating characteristics, and it is not intended that the novel features of the present invention shall be limited in any particularity thereby.

In a conventional operation, as a tubular film of heated thermoplastic material is discharged from the die aperture, it is drawn therefrom by means of nip or pinch rolls designated by the numerals 31 and 33. At least one of these rolls will be driven by any suitable means (not shown), and at least one roll will be provided for radial adjustment with reference to the other whereby to accommodate for different thickness or gauges of the films produced. Guides rolls 34 are employed to flatten the tube gradually and lead it into the pinch rolls. From the pinch rolls 31 and 33, the finished material may be passed, either directly or by way of other forming, cutting or processing steps, to suitable packaging means. As shown the film is received by a winding roll 35 mounted on a driven shaft 37.

Conventionally also, as the film issues from the die, be it in the form of a flat web or sheet, or in a continuous tubular web such as in the operation illustrated, it is subjected to shock cooling. For example, the extruded web issuing from the die aperture 17 may have a temperature in the range of from about 210° F. to about 400° F. or higher, but preferably in the range of from about 280° F. to about 330° F. At such temperatures, and dependent upon the physical characteristics of the raw material, it has been considered essential that the molecular structure be converted from an amorphous to a crystalline state as quickly as possible. For this purpose, it is customary to pass the extruded material through one or more cooling zones. A flat sheet or web may be immediately immersed in a water bath. A tubular web usually is cooled by passage through a zone in which a gaseous fluid, such as air at reduced or ambient temperatures is discharged against the web surface, or in which the web surface is passed into indirect heat exchange with a cooling fluid immediately following discharge from the die aperture. For example, a web issuing at a temperature of about 275° F. may be shock chilled to a temperature of around 210° F. within a relatively short distance.

Cooling may be accomplished as by means such as shown in FIG. 1 of the drawing, wherein the numeral 41 designates an annular hollow body or ring having an inverted, frustoconically shaped inner wall 43. In this ring the wall 43 flares upwardly and outwardly from the lower or inner end. In the conventional apparatus, the lower end of the inner wall would be approximately equal in diameter to the outer diameter of the die aperture. A conduit 45, having a valve 47, supplies a slightly pressurized flow of air from a source not shown, and this air is discharged against the web or film as by means such as the ports 49 circumferentially of the inner wall 43. An annular internal baffle 50 aids uniform delivery of air by way of the ports 49. In the conventional system, however, the ring member 41 is disposed immediately after the die discharge aperture.

As compared with the conventional system, according to the present invention, the cooling zone, provided by the ring 41, is disposed in axially spaced relation to the die aperture 17 by a distance of from about four to about twenty-eight inches, and preferably in the range of about six to about ten inches. In this space between the cooling ring 41 and the upper end of the die, as represented by the nipple 9, is disposed an annealing chimney 51. As shown, the chimney is a tubular metal pipe having upper and lower end portions of which the lower end portion is threaded to be engaged by a coupling nut 53 also adapted to engage the threaded upper end of the flanged nipple 9. Other materials than metals may be employed to form the chimney, including wood, glass, ceramics, and even certain types of paperboard or cardboard. However, where a material of high heat conductivity is employed, insulation should be applied exteriorly of the chimney. In FIG. 1, the numeral 55 designates an insulating material such as asbestos enclosing the metal chimney.

Also, means other than the coupling nut arrangement shown in FIGS. 1 and 2 may be employed to position and retain the chimney. For example, the chimney could be held as in a separately mounted clamp, or be suspended from the ring 41. Further, where exact temperature control within the chimney is desired, heat exchange means such as a fluid heat exchanger jacket, or a resistance heater unit may be provided to enclose the chimney. Such means may be applied to the chimney or be integral therewith. In FIG. 2, a resistance heater unit 57 prevents heat loss through the chimney 51, replacing the insulation 55 of FIG. 1.

As shown in both FIG. 1 and FIG. 2, the chimney 51 has a diameter greater than the outer diameter of the die annular aperture 17. The relationship of chimney diameter to die aperture inner diameter may be determined in the ratio range of from about 1.1:1 and about 4:1. Preferably this ratio range will be from about 2:1 to about 3:1 (e.g. for a die aperture having an outer diameter of three inches, a chimney having an inner diameter of from about six to about nine inches is preferred).

As noted above, means other than the coupling nut arrangement may be employed to position and retain the annealing chimney 51 of FIGS. 1 and 2. One such means is illustrated by FIG. 3, which figure further illustrates an assembly which contemplates the employment of a two part chimney, whereby the chimney may be applied after engaging the extruded film in the nip rolls, and avoiding the difficulties attendant upon the need for threading the film through a single element chimney.

As shown in FIG. 3, the assembly includes a nipple 69, and a two part chimney element wherein the parts are designated by the numerals 71 and 73 (for simplification the showing of insulation or heating elements normally associated with the chimney element, in the manner according to FIGS. 1 and 2, has been omitted), and a two part clamping collar wherein the parts are designated by the numerals 75 and 77.

The nipple 69 corresponds to the nipple 9 of FIGS. 1 and 2. Specifically it includes an inner end portion 69a provided for engagement in the passageway 7 of a die body such as 5 in FIGS. 1 and 2, an outer end portion 69b, and an intermediate flanged portion, here designated by the numeral 69c. The outer end portion 69b of nipple 69, instead of being threaded, as in the corresponding form 9, is provided with an annular, radially extending flange portion 79 intermediate the extremes of the end portion, and in axially spaced relation to the flange 69c.

The chimney parts 71 and 73 are matched, semi-circular sections of an annular unit having an external body diameter substantially equal to that of the nipple end 69b, and an internal diameter slightly greater than that of the nipple bore. These relationships are of a nature equivalent to that previously established between the chimney 51 and the die aperture 17, with reference to the structures of FIGS. 1 and 2. Although not shown, if desired, the chimney parts 71 and 73 may be secured in hinged relationship along one of the matching longitudinal edge portions.

The matched parts 71 and 73 are to be considered as having inner and outer ends, the inner ends being adapted for assembled abutting relationship to the outer end of the nipple end portion 69b. When thus assembled, the outer surface of the chimney formed is substantially continuous with that of the nipple outer end portion.

Each of the chimney parts 71 and 73 is provided at its inner end with a substantially integral semi-circular, radially extending, flange portion, 71a and 73a respectively. Each flange portion is concentric with the chimney part with which associated and spaced from the end thereof at a distance substantially equal to the distance at which the flange 79 on nipple end portion 69b is spaced from the end thereof. Also, the flange portions 71a and 73a have a width substantially equal to the flange 79. Preferably, means such as drilled ear lugs 71b and 73b are provided at the outer end edge portions of the chimney parts to permit fixed juncture of the parts by means of a bolt 72 and nut 72a.

The clamping collar parts 75 and 77 are identical, semi-circular sections of an annular collar unit. With these sections united, as by means of bolts extended through drilled ear lugs, such as indicated by the numerals 75a, 77a, 75b, and 77b (not shown) the unit formed has an internal diameter substantially equal to the external diameters of the nipple outer end 69b, and of the assembled chimney unit. If desired, the collar unit also may be secured along one juncture edge by hinge means instead of ear lugs.

The inner surface of each collar part, 75 and 77, defines a pair of recess portions. In FIG. 3, the recess portions of part 75 are designated by the numerals 81 and 89. In the respective parts, the corresponding recesses are disposed for matching and mating relationship in the collar when assembled as a unit. In each part, the recesses are disposed in paired, parallel relation, and spaced one from another, axially of the unit, by a distance substantially twice that of the spacing of the flanges, 71a, 73 and 79 from the next adjacent ends of parts 71, 73, and 69b respectively. Also, the recess 89, and its counterpart in element 77 preferably are spaced from the next adjacent end portions of the parts 75 and 77, by a distance substantially equal to that between the flanges 79 and 69c.

With the nipple 69 replacing the nipple 9 of FIGS. 1 or 2, extrusion is started, and the tubular film produced is led through the nip rolls. As soon as a degree of extrusion control has been attained, the chimney parts 71 and 73 may be applied to the end of the nipple portion 69b and joined, to enclose the film leaving the die lip, and the bolt and nut 72 and 72a inserted to maintain the chimney joint. The collar parts 75 and 77 are then applied to enclose the outer end of the nipple 69b and the inner end of the chimney unit. As thus applied, the flanges 71a, 73a, and 79 are received in the continuous recesses formed by portions 81 and 91 and by 89 with its counterpart in part 77. The collar parts may then be bolted together to complete the assembly.

In accordance with conventional methods for producing films of thermoplastic materials, the thermoplastic material is fed into an extruder, such as that indicated by the numeral 1, heated therein and forced therefrom in a molten condition through a film forming die. Where a film is to be produced in a tubular form, the extrusion and die mechanisms would be substantially similar to those illustrated in FIG. 1. The tube produced is led into engagement between the pinch rolls 31 and 33, and eventually to the winding roll 35. In the transition from the extrusion die to the pinch rolls, it is customary immediately to chill the film while expanding its diameter, whereby to stretch the film, decreasing the gauge or thickness thereof from that existing at the die aperture. Stretching the film by expansion diametrically also produces transverse molecular orientation of the component material. At the same time, the "draw down" rate of the pinch rolls and of the winding roll is adjusted to a speed which is slightly greater than the discharge rate at the die aperture. Thus, the tube is stretched along its travel axis to produce molecular orientation in a longitudinal direction.

Expansion of the tube is accomplished customarily by means of a gaseous fluid introduced into the tube, substantially at the die face, whereby immediate contact of the tube with the chilled surface of the cooling ring, and the fluid discharge therethrough is facilitated. According to the conventional concepts, it has been considered essential that the transverse and axial stretching and thinning of the film material, with attendant molecular orientation, take place concurrently with shock chilling, and in the immediate vicinity of the die aperture.

In the method according to the present invention the conversion of molecules in the extruded film from an amorphous to a crystalline state is delayed for a brief period, during which the film is passed through an annealing zone maintained at substantially the film temperature at the point of discharge through the die. As previously indicated, substantial improvements are attained in haze, gloss and light transmittance characteristics of the finished film merely by restricting heat loss from the film while it is passed through an insulated annealing zone such as shown in FIG. 1. Still further improvement may be obtained by employment of an annealing zone such as shown in FIG. 2 where, as by means such as a resistance heater, the temperature of the film is raised to a degree slightly above that existing in the film at the die aperture.

In a typical operation according to the present invention the thermoplastic material is discharged from the die aperture at a temperature of about 300° F., to produce a sheeted tubular film wherein the film has an initial gauge substantially equivalent to the width of the die aperture, namely in the range of from about 20 to about 35 mils (0.5 to 0.9 mm.). The initial formed tube then passes through the annealing zone provided, as by the chimney 51 shown in the drawings, and thence through one or more cooling zones represented by the cooling ring 41, and as provided by exposure to the ambient atmosphere in the travel distance preceding the pinch rolls 31 and 33. By insulation, as shown in FIG. 1, or auxiliary heating means, as shown in FIG. 2, the temperature of the film as drawn through the annealing zone is maintained at substantially the initial discharge temperature, with not more than about a 50° reduction during passage through the zone. Although some attenuation or thinning of the film gauge is effected during passage of the film through the annealing zone, due to the usual adjusted difference between the extrusion rate and the winding or "haul-off" rate, and the slightly enlarged travel path provided by the chimney, such attenuation is accomplished while the film molecules are in their initial amorphous condition at the annealing and extrusion temperatures, thus molecular orientation of the film does not take place until the film is chilled to a temperature at which the molecules change from an amorphous to a crystalline condition.

In the conventional operation, the haul-off rate is regulated primarily to attain the desired molecular orientation in the direction of film travel. According to the present invention, such regulation is also employed to attain a desirable dwell or residence time of the film in the annealing chamber. This time may range from about 0.1 second to about 20.0 seconds for good results. For best results it is preferred that residence time be in the range from about 0.5 second to about 2.0 seconds. Obviously, at any given haul-off rate, residence time may be varied by increasing or decreasing chimney length.

Molecular change is initiated in the cooling zone located immediately beyond the outlet from the annealing zone. As the annealed film passes through the cooling zone represented by the ring member 41, it is permitted to expand under the controlled pressure of a gaseous fluid, such as air, introduced by way of the conduit and control valves 23 and 25 respectively, bore 19 and conduit 21. This pressure and air volume is contained between the pinch rolls 31 and 33 and the extrusion die face, whereby to expand the film tube and to reduce the film gauge. As a result of the axial and transverse expansion of the film while cooling to convert the film molecules from an amorphous to a crystalline state or condition, the molecules are oriented in the desired fashion.

By annealing the extruded film in the manner disclosed, a film having greatly improved characteristics of haze, gloss, and light transmissivity has been produced. Still greater improvement has been obtained by carrying out the annealing step at temperatures elevated to a degree above that at which the thermoplastic material is discharged from the die aperture. The upper limit of such applied annealing temperatures is limited substantially only by the effectiveness of the cooling step to reduce the temperature of the film to a degree where formation of a crystalline molecular structure is initiated at a level ("frost line") not substantially beyond the initial cooling zone. Depending upon the greatest diameter of the expanded film tube, and upon the final temperature attainable at the pinch rolls, this level (frost line) may be from four to twenty-four inches beyond the exit from the annealing zone.

The effectiveness of the method according to the present invention for the purpose of improving the optical characteristics of typical polyethylene films is specifically set forth by the following tabulations of results obtained when operating in accordance with conventional procedures as compared with those results obtained when employing an annealing zone intermediate the extruder die aperture and cooling zone.

TABLE I
EVALUATION OF OPTICAL PROPERTIES OF UNANNEALED AND ANNEALED POLYETHYLENE FILMS
[Insulated and heated chimneys]

| Test No. | 96-18A | 96-18D | | |
|---|---|---|---|---|
| Sample No. | 1 | 1 | 1 | 1 |
| Finished Film Gauge in Mils | 1.5 | 1.5 | 1.5 | 1.5 |
| Extrusion Temp., °F | 300 | 300 | 300 | 300 |
| Chimney Ht., Inches | 0 | 10 | 6 | 6 |
| Chimney Temp. at Outlet, °F | | 280 | 300 | 350 |
| Haze, percent | 10.7 | 6.0 | 7.8 | 4.8 |
| Gloss, percent | 7.05 | 9.7 | 8.6 | 10.4 |
| Transmittance, percent | 28.4 | 40.0 | 56.3 | 69.1 |

TABLE II
EVALUATION OF OPTICAL PROPERTIES OF UNANNEALED AND ANNEALED POLYETHYLENE FILMS
[Unheated chimney]

| Test No. | 96-18A | 96-18B | 96-18C | 96-18D | 96-19B | 96-19A | 96-20A | 96-20B | | 96-20D |
|---|---|---|---|---|---|---|---|---|---|---|
| Sample No. | 1 | 1 | 1 | 1 | 2 | 2 | 3 | 3 | 4 | 4 |
| Finished Film Gauge in Mils | 1.5 | 1.5 | 1.5 | 1.5 | 1.25 | 1.25 | 1.0 | 1.5 | 1.5 | 1.5 |
| Extrusion Temp., °F | 300 | 300 | 300 | 300 | 310 | 310 | 300 | 300 | 320 | 320 |
| Chimney Ht., Inches | 0 | 6 | 8 | 10 | 0 | 8 | 0 | 8 | 0 | 8 |
| Aver. Chimney Temp., °F | | 280 | 280 | 280 | | 280 | | 280 | | 280 |
| Haze, percent | 10.7 | 6.6 | 6.3 | 6.0 | 7.1 | 5.2 | 18.1 | 7.6 | 6.9 | 4.1 |
| Gloss, percent | 7.05 | 8.0 | 9.5 | 9.7 | 9.2 | 10.4 | 5.04 | 8.19 | 9.6 | 11.76 |
| Transmittance, percent | 28.4 | 40.6 | 39.8 | 40.0 | 58.8 | 70.8 | 24.5 | 54.6 | 66.2 | 81.8 |
| Annealing Time, sec | | 0.5 | 0.67 | 0.83 | | | | 0.67 | | 2.0 |

In the results shown above, haze percent was measured in accordance with ASTM–D1003–52, and gloss percent was measured according to ASTM–D–523–23T. Transmittance percent was determined by comparative measurement of the intensity of a collimated, focused light beam passed through a fluid medium, such as air, with and without interference of an annealed or unannealed polyethylene film, the result being recorded as a percentage of the light intensity recorded in the absence of an interfering film, the latter being taken as 100%.

As shown by the foregoing tables, the greatest improvement of haze percent, gloss percent, and transmittance percent was obtained where the annealing temperature was higher than the extrusion temperature (Table I). Improvement over the operations in the conventional manner with die discharge of film directly into a cooling zone, however, was evident from every instance wherein the film temperature was maintained at not less than 50° F. below the extrusion temperature (Tables I and II). Also, as shown from Table I, the results obtained by use of a six inch annealing chimney heated to 50° F. above the extrusion temperature were substantially superior to those obtained by using a ten inch insulated chimney.

What is claimed is:

In a method of forming a continuous tube from a thermoplastic material of the character described, wherein said material is softened under heat and pressure to a substantially uniform extrudable consistency, extruded to form a continuous tube of said material and said tube is then passed through at least one cooling zone and stretched to produce molecular orientation in said tube, the improvement which comprises defining a confined path of movement extending between the point of extrusion and said cooling zone, passing said tube as formed by extrusion through said confined path of movement without contact, maintaining said extruded tube at not substantially less than its extrusion temperature and at substantially extrusion dimensions during passage through said confined path of movement, and introducing fluid pressure into said tube after it has passed through said confined path of movement to increase the diameter thereof and produce molecular orientation in said tube.

References Cited by the Examiner
UNITED STATES PATENTS

| | | |
|---|---|---|
| 2,047,554 | 7/1936 | Fischer. |
| 2,364,435 | 12/1944 | Foster et al. |
| 2,433,937 | 1/1948 | Tornberg. |
| 2,583,330 | 1/1952 | Eckert. |
| 2,698,463 | 1/1955 | Conwell et al. |
| 2,953,428 | 9/1960 | Hunt et al. |

FOREIGN PATENTS

| | | |
|---|---|---|
| 173,082 | 5/1905 | Germany. |
| 694,870 | 7/1953 | Great Britain. |

ROBERT F. WHITE, *Primary Examiner.*

ALEXANDER H. BRODMERKEL, WILLIAM J. STEPHENSON, MICHAEL V. BRINDISI, *Examiners.*

S. NEIMARK, W. E. THOMSON, M. H. ROSEN, M. R. DOWLING, *Assistant Examiners.*